United States Patent
Oh et al.

(10) Patent No.: US 11,919,520 B2
(45) Date of Patent: Mar. 5, 2024

(54) WHEEL SLIP CONTROL METHOD OF VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR); Ki Mo Sohn, Suwon-si (KR); Lee Hyoung Cho, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 356 days.

(21) Appl. No.: 17/178,046

(22) Filed: Feb. 17, 2021

(65) Prior Publication Data
US 2022/0105943 A1 Apr. 7, 2022

(30) Foreign Application Priority Data
Oct. 7, 2020 (KR) .......................... 10-2020-0129356

(51) Int. Cl.
*B60W 30/18* (2012.01)
*B60T 7/12* (2006.01)
(Continued)

(52) U.S. Cl.
CPC ......... *B60W 30/18172* (2013.01); *B60T 7/12* (2013.01); *B60T 8/175* (2013.01);
(Continued)

(58) Field of Classification Search
CPC ... B60T 8/00; B60T 17/10; B60T 8/17; B60T 8/17558; B60T 8/176; B60T 8/1761;
(Continued)

(56) References Cited

U.S. PATENT DOCUMENTS

2007/0282512 A1* 12/2007 Hoeck .................... B60K 23/04
701/69
2019/0179335 A1* 6/2019 Cha ....................... G05D 1/0005
(Continued)

OTHER PUBLICATIONS

Cho, Wanki, et al. "Estimation of tire forces for application to vehicle stability control." IEEE Transactions on Vehicular Technology 59.2 (2009): 638-649.
(Continued)

*Primary Examiner* — Donald J Wallace
(74) *Attorney, Agent, or Firm* — MCDONNELL BOEHNEN HULBERT & BERGHOFF LLP

(57) ABSTRACT

A wheel slip control method for a vehicle is provided, and includes estimating equivalent inertia information of a driving system based on operation information of the driving system while a vehicle travels, determining whether the slip of a drive wheel occurs from the estimated equivalent inertia information of the driving system, determining whether the drive wheel is in an uneven wheel slip state where the slip occurs only in one of a left wheel and a right wheel of the drive wheel from a left wheel speed and a right wheel speed detected by a sensor, if it is determined that the slip of the drive wheel occurs, and controlling an operation of a braking device such that a braking force is applied to the vehicle wheel in which the slip occurs, if it is determined that the vehicle wheel is in the uneven wheel slip state.

16 Claims, 8 Drawing Sheets

(51) Int. Cl.
*B60T 8/175* (2006.01)
*B60W 10/04* (2006.01)
*B60W 10/18* (2012.01)

(52) U.S. Cl.
CPC ............ *B60W 10/04* (2013.01); *B60W 10/18* (2013.01); *B60W 2520/12* (2013.01); *B60W 2520/266* (2013.01); *B60W 2520/28* (2013.01); *B60W 2556/10* (2020.02); *B60W 2710/18* (2013.01)

(58) Field of Classification Search
CPC ...... B60T 8/175; B60T 8/4809; B60T 8/1701; B60T 8/489; B60T 8/48; B60T 8/1755; B60T 8/17551; B60T 8/17552; B60T 8/17554; B60T 8/17555; B60T 8/17557; B60K 28/16; F16D 2500/3118; F16D 2500/5075; B60W 2520/26; B60W 2720/26; B60W 30/18172; B60W 2540/12; B60Y 2300/18175; B60G 2800/21; B60G 2800/212; B60G 2800/213; B60G 2800/214; B60G 2800/215; B60G 2800/95; B60G 2800/952; B60G 2400/39; B62D 6/007
See application file for complete search history.

(56) References Cited

U.S. PATENT DOCUMENTS

2019/0344796 A1* 11/2019 Lian ................ B60W 30/18172
2021/0215246 A1* 7/2021 Shen ....................... F16H 61/04

OTHER PUBLICATIONS

Korean patent application No. 10-2019-0092527 as filed Jul. 30, 2019.
Korean patent application No. 10-2019-0092528 as filed on Jul. 30, 2019.
Korean patent application No. 10-2019-0095953 as filed on Aug. 7, 2019.
Korean patent application No. 10-2019-0096432 as filed on Aug. 8, 2019.
Korean patent application No. 10-2019-0096433 as filed on Aug. 8, 2019.

* cited by examiner

WHEEL SLIP CONTROL METHOD OF VEHICLE

CROSS-REFERENCE TO RELATED APPLICATION

This application claims under 35 U.S.C. § 119(a) the benefit of priority to Korean Patent Application No. 10-2020-0129356 filed on Oct. 7, 2020, the entire contents of which are incorporated herein by reference.

BACKGROUND

(a) Technical Field

The present disclosure relates to a wheel slip control method of a vehicle, and more specifically, to a wheel slip control method of a vehicle which may suppress a wheel slip without unnecessarily decreasing a driving force in a vehicle mounted with an open differential.

(b) Background

Generally, electronic control systems exist for improving safety while a vehicle travels, such as an anti-lock brake system (ABS) configured to prevent a brake locking due to a wheel slip on a slippery road surface when the vehicle is braked, a traction control system (TCS) configured to control a driving force or a braking force upon sudden unintended acceleration and sudden acceleration of the vehicle to prevent a wheel slip, an electronic stability program (ESP) configured to stably control the posture of the vehicle, or the like.

Among them, the TCS is an active safety device configured to prevent an excessive slip of a drive wheel upon startup or acceleration of the vehicle, or turning of the vehicle on a low frictional road surface or an asymmetric road surface, thereby preventing vehicle spin and improving startup and acceleration performance of the vehicle, operation stability, and traveling stability.

If excessive driving force is generated and thus the wheel slip of the drive wheel occurs when the vehicle starts or accelerates on the slippery road surface, the TCS decreases a driving force (driving torque) of the vehicle to control the speed of the drive wheel, thereby suppressing the wheel slip.

Here, the driving force of the vehicle is a force driving the vehicle; that is, a force by a torque output by a driving device of the vehicle, and a force transferred from the driving device to a vehicle wheel (drive wheel) through a driving shaft.

The driving device of the vehicle configured to decrease the driving force for suppressing the wheel slip when the TCS is operated may be a motor (pure electric vehicle, fuel cell vehicle), an engine (internal combustion engine vehicle), or the motor and the engine (hybrid vehicle) according to the vehicle type.

For example, the motor driven vehicle such as the pure electric vehicle (battery electric vehicle), the fuel cell vehicle, or the hybrid vehicle determines a target drive wheel speed capable of obtaining an optimal driving force in the drive wheel according to an amount of sap, a road surface frictional coefficient, and the like generated between the drive wheel and the road surface, and controls the motor torque to follow the target drive wheel speed.

Further, the motor torque is decreased to prevent the instability of the vehicle when the vehicle turns on a corner road such that the vehicle may safely turn.

The torque is adjusted in the direction of suppressing the slip by calculating the slip of the vehicle wheel based on an actual vehicle speed during traveling when the TCS is operated, and a control of reducing and correcting a torque instruction of the driving device to decrease the driving force (driving torque) is performed to suppress the slip.

Meanwhile, despite the introduction of various electronic control systems into the vehicle, the behavior of the vehicle is finally restricted by a limit of a road surface frictional force.

This is because the behavior of the vehicle is obtained by the frictional force with the road surface through a tire, such that how effectively frictional force is used becomes an important factor in determining the behavior of the vehicle.

The maximum road surface frictional force is compositely affected by characteristics of the road surface, longitudinal/transverse directional tire slips, a tire vertical bad, or the like, and as the size of the slip generally increases, an available frictional force is decreased.

Therefore, it is important to suppress the tire slip (wheel slip) of the vehicle wheel to maintain the effective longitudinal/transverse frictional forces, and the electronic control system such as the ABS or the TCS in the vehicle is in charge of the above role.

However, a conventional wheel slip suppress control method has the following problem.

As is well known, the slip between the tire and the road surface decreases an available traction for the corresponding vehicle wheel, and when the available traction of the vehicle wheel is decreased, the startup ability of the vehicle is lowered. This is particularly fatal to the low frictional road surface.

To address this problem, the related art performs a driving force decrease control (torque reduction control) of decreasing the driving force transferred from the driving device of the vehicle to the vehicle wheel to suppress the slip in consideration of the decrease in the available traction in the vehicle wheel in which the slip occurs.

The driving force generated by the driving device may be construed as having the same meaning as the torque generated by the driving device, that is, the driving torque, unless specially classified and described otherwise in the following description.

FIG. 1, described in further detail below, is a diagram illustrating the problems of the related art, in which reference numeral 1 refers to the driving device, and reference numeral 2 refers to a reducer.

FIG. 1 illustrates an example in which a driving force decrease control is performed when the slip is generated in the vehicle mounted with an inexpensive open differential 3 rather than an expensive electronic limited slip differential (LSD).

The vehicle mounted with the general open differential 3 has a distribution ratio, which is fixed at a ratio of 50:50, of the driving force for a left wheel 4 and a right wheel 5, which means that the driving force having the same magnitude is applied to the left wheel and the right wheel.

FIG. 1 illustrates an uneven wheel slip state where the slip occurs only in one of the left wheel 4 and the right wheel 5.

The size of the circle (radius) indicated on each of the left wheel and the right wheel represents an available traction size of the corresponding vehicle wheel in the top drawing and bottom drawing in FIG. 1.

Further, the arrow of each vehicle wheel (arrow in the forward direction of the vehicle) directing upward in the drawing in the top drawing and bottom drawing in FIG. 1 shows that the driving force is applied to the corresponding vehicle wheel, wherein the length of the arrow represents the magnitude of the driving force.

Referring to FIG. 1, the driving force having the same magnitude is distributed to the left wheel 4 and the right wheel 5 through the open differential 3 in the state where the available traction of the left wheel is smaller than that of the right wheel.

In the example of FIG. 1, since the left wheel 4 has the driving force larger than the available traction, the wheel slip occurs, and since the right wheel 5 has the available traction lager than the driving force, the wheel slip does not occur.

As described above, the uneven wheel slip state where the slip occurs only in the left wheel 4 may be the state where the slip occurs only in the left wheel 4 due to the side road surface frictional force on the asymmetric road surface in which the road surface on which the left wheel is grounded is the low frictional road surface compared to the road surface on which the right wheel 5 is grounded, or the state where the slip occurs only in the left wheel due to the side load when the vehicle turns to the left.

If the vehicle turns to the left, the uneven wheel slip state may appear, where the wheel slip does not occur in the right wheel 5, which is the outer wheel, the wheel slip occuring only in the left wheel 4, which is the inner wheel, due to the vehicle tilting and the side load.

The increase in the rotating speed in the vehicle wheel in which the slip occurs as compared to the vehicle speed at which the slip does not occur is a technical phenomenon known in the art.

As illustrated in the left drawing in FIG. 1, in the uneven wheel slip state where the slip occurs only in the left wheel 4, according to the conventional wheel slip control method, when the driving force (driving torque) is decreased to suppress the wheel slip, the driving force is decreased by the same amount in the left wheel 4 and the right wheel 5 in the vehicle mounted with the open differential 3.

As a result, in the example of FIG. 1, even if the right wheel 5 in which the slip does not occur has the available traction larger than the driving force and thus there is room for the available traction (see the top drawing in FIG. 1), the driving force is unnecessarily decreased even in the right wheel in which the slip does not occur by the same amount as that of the left wheel 4 in which the slip occurs in order to suppress the wheel slip (see the bottom drawing in FIG. 1).

This is because the open differential 3 may distribute the torque to the left wheel 4 and the right wheel 5 only at the ratio of 50:50 and may not decrease the driving force only for one of the left wheel and the right wheel.

Therefore, there is a need for a method capable of addressing a driving force being unnecessarily decreased even for the vehicle wheel in which the slip does not occur, which may secure the additional traction, as with the vehicle wheel in which the slip occurs for suppressing the slip in the uneven wheel slip state.

The above information disclosed in this Background section is only for enhancement of understanding of the background of the disclosure and accordingly it may contain information that does not form the prior art.

SUMMARY OF THE DISCLOSURE

The present disclosure is intended to solve the above problems, and an object of the present disclosure is to provide a wheel slip control method of a vehicle, which may solve the problem of the driving force being unnecessarily decreased even for a vehicle wheel in which the slip does not occur, which may secure the additional traction in a driving force decrease control.

Specifically, an object of the present disclosure is to provide a wheel slip control method for a vehicle, which may suppress the wheel slip without unnecessarily decreasing a driving force in a vehicle mounted with a general open differential without an expensive LSD.

Further, another object of the present disclosure is to provide a wheel slip control method for a vehicle, which may control a driving device such that a driving force within an available traction range may be applied to a vehicle wheel in which the slip occurs even without decreasing the driving force output by the driving device in estate where an uneven wheel slip occurs, thereby quickly suppressing the slip of the vehicle wheel.

Yet another object of the present disclosure is to provide a method capable of controlling the wheel slip of a vehicle wheel without using a reference speed known in the vehicle.

To achieve the above objects, an exemplary embodiment of the present disclosure provides a wheel slip control method of a vehicle including: estimating, by a control unit, equivalent inertia information of a driving system based on operation information of the driving system while a vehicle travels; determining, by the control unit, whether the slip of a drive wheel occurs from the estimated equivalent inertia information of the driving system; determining, by the control unit, whether the vehicle wheel is in an uneven wheel slip state where the slip occurs only in one of a left wheel and a right wheel of the drive wheel from a left wheel speed and a right wheel speed detected by a sensor, if it is determined that the slip of the drive wheel occurs; and controlling, by the control unit, an operation of a braking device such that a braking force is applied to the vehicle wheel in which the slip occurs, if it is determined that the vehicle wheel is in the uneven wheel slip state.

Here, the vehicle may be a vehicle mounted with an open differential distributing a driving force of the driving device configured to drive the vehicle to the left wheel and the right wheel at a ratio of 50:50.

Further, a value of the equivalent inertia information may be an equivalent inertia change amount which is a difference between the equivalent inertia of the driving system obtained in real time and basic equivalent inertia having a predetermined value.

Further, the wheel slip control method of the vehicle according to the exemplary embodiment of the present disclosure may further include: calculating, by the control unit, a lateral load movement amount of the vehicle from current vehicle traveling information collected by the vehicle; comparing, by the control unit, the calculated lateral load movement amount of the vehicle with a first movement amount threshold; and controlling, by the control unit, an operation of the braking device such that the braking force is applied to a vehicle wheel corresponding to an inner wheel upon turning, by determining that an uneven load of a predetermined level or more occurs in the vehicle while the vehicle turns, if the calculated lateral load movement amount of the vehicle is larger than the first movement amount threshold.

Further, the wheel slip control method of the vehicle according to the exemplary embodiment of the present disclosure may further include: determining, by the control unit, whether a current vehicle state reaches a slip suppress alleviating condition based on the lateral load movement amount of the vehicle obtained by the estimated equivalent inertia information of the driving system and current vehicle traveling information, while the braking force is applied to the vehicle wheel in which the slip occurs by controlling the operation of the braking device; and controlling the operation of the braking device such that the braking force applied to the vehicle wheel in which the slip occurs is decreased by a predetermined amount, if the current vehicle state reaches the slip suppress alleviating condition.

Further, the wheel slip control method of the vehicle according to the exemplary embodiment of the present disclosure may further include: performing, by the control unit, a driving force decrease control of decreasing the driving force of the driving device transferred to the drive wheel, if it is determined that the vehicle wheel is in the state where the slip occurs both in the left wheel and the right wheel of the drive wheel from the left wheel speed and the right wheel speed detected by the sensor.

As a result, the wheel slip control method of the vehicle according to the present disclosure may individually maximize the road surface traction for each of the left wheel and the right wheel connected to one driving shaft through the differential by selectively applying the braking force to only the vehicle wheel in which the slip occurs in the state where the uneven wheel slip occurs.

Therefore, the wheel slip control method of the vehicle according to the present disclosure may solve the problem of the conventional driving force decrease control of unnecessarily decreasing the driving force even for the vehicle wheel in which the slip does not occur, which may secure the additional traction.

Further, the present disclosure may simply maximize the road surface traction for each vehicle wheel only by improving the control logic without increasing the cost or causing the additional cost in the vehicle mounted with the open differential without the expensive LSD.

Further, the present disclosure determines the occurrence of the wheel slip based on the equivalent inertia information, and determines the braking force application amount, the driving force decrease amount, or the like based on the equivalent inertia information, such that it is unnecessary to use the reference speed unlike in the conventional TCS control.

Further, the conventional TCS control method has difficulty in maintaining the ideal control performance due to the reason such as the wheel speed signal processing for preventing the control cycle delay or malfunction, thereby not maintaining the slip condition exerting the maximum road surface frictional force and causing the large slip, but the present disclosure may preemptively restrict the wheel slip even in the transient section which is before the conventional TCS control or the wheel slip control is operated using the equivalent inertia information, thereby improving the traveling stability of the vehicle compared to the conventional TCS control method.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE DRAWINGS

The above and other features of the present disclosure will now be described in detail with reference to certain exemplary examples thereof illustrated in the accompanying drawings which are given hereinbelow by way of illustration only, and thus are not limitative of the present disclosure, and wherein.

Figure 1:
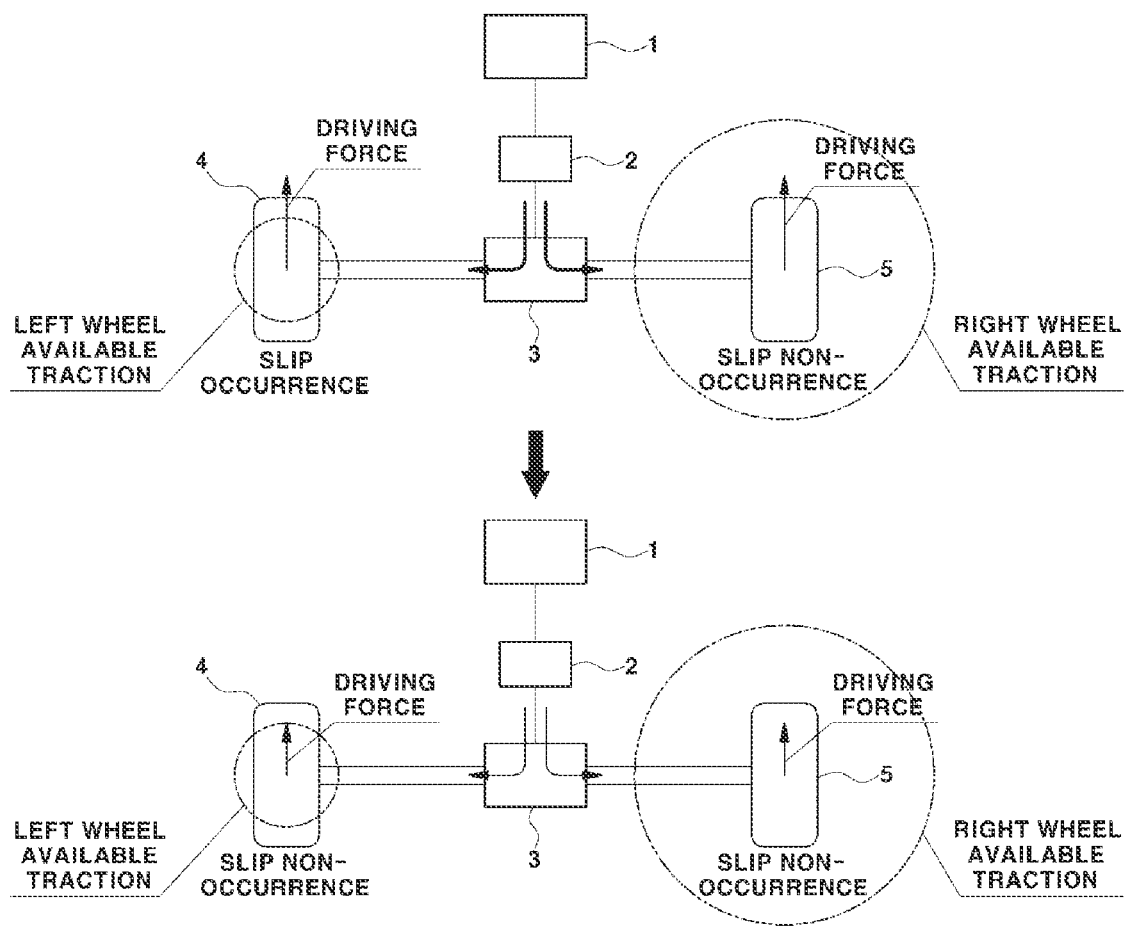
FIG. 1 is a diagram illustrating a problem of a wheel slip control method of a vehicle according to the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, exemplary embodiments of the present disclosure will be described in detail with reference to the accompanying drawings such that those skilled in the art to which the present disclosure pertains may easily implement the present disclosure. However, the present disclosure is not limited to the exemplary embodiments described herein and may also be specified in other forms.

Throughout the specification, when a part is said to "comprise" a component, it means that other components may be further included rather than excluding other components unless specifically otherwise stated.

The present disclosure is mainly characterized in that an individual slip control for each vehicle wheel is performed to apply a braking force to only a vehicle wheel, in which the slip occurs, of both left and right vehicle wheels connected to a driving device through a single driving shaft using a braking device installed on each vehicle wheel and capable of an individual control in a vehicle, a wheel slip control technology based on equivalent inertia is applied, and the like.

Here, the braking device may be a known hydraulic braking device as a frictional braking device, and a known wheel brake installed on each of both left and right vehicle wheels and capable of generating and applying a braking force individually controlled for the corresponding vehicle wheel.

Describing the background of introducing the wheel slip control technology based on the equivalent inertia in the present disclosure, there is a problem in that the known ABS or TCS control method has difficulty in maintaining ideal control performance due to the reason such as a wheel speed signal processing for preventing a control cycle delay or malfunction, thereby not maintaining a slip condition exerting the maximum road surface frictional force and causing the large slip.

Therefore, other than the conventional TCS control of decreasing the driving force based on the slip speed, a wheel slip suppress control technology based on the equivalent inertia may be used, and the wheel slip suppress control technology based on the equivalent inertia is effective to suppress the slip amount itself of the vehicle wheels connected to the single driving shaft.

However, there exists a limit in which the wheel slip suppress control technology based on the equivalent inertia may not individually control the slip of each vehicle wheel; that is, individually the slips of the left wheel and the right wheel in the drive wheel with respect to a plurality of vehicle wheels connected to the single driving shaft.

Further, the wheel slip suppress control technology based on the equivalent inertia may have the effect of maximizing the road surface traction by suppressing the slips of the vehicle wheels (front wheel or rear wheel) connected to an individual driving shaft such as a front wheel driving shaft or a rear wheel driving shaft, but has a limit to individually maximizing the road surface traction of the vehicle wheel for each of two vehicle wheels (left wheel and right wheel of the drive wheel) connected to the single driving shaft through a differential.

Further, the wheel slip suppress control technology based on the equivalent inertia may obtain the effect of individually maximizing the road surface traction for each of the front wheel and the rear wheel through the individual slip suppress control of the front wheel driving shaft and the rear wheel driving shaft connected to the respectively independent driving devices, but has a limit to maximizing each of the road surface tractions of the front wheel and the right wheel connected to the single driving shaft.

Therefore, the present disclosure suggests an improved wheel slip suppress control method capable of individually maximizing the road surface traction even for the vehicle wheels connected to the single driving shaft by applying a braking control technology for each vehicle wheel together with the wheel slip control based on the equivalent inertia.

The wheel slip control method according to the present disclosure may not change a distribution ratio of the driving force for the left wheel and the right wheel and is useful for the vehicle mounted with a general open differential distributing the same driving force to the left wheel and the right wheel at a ratio of 50:50.

Figure 2:
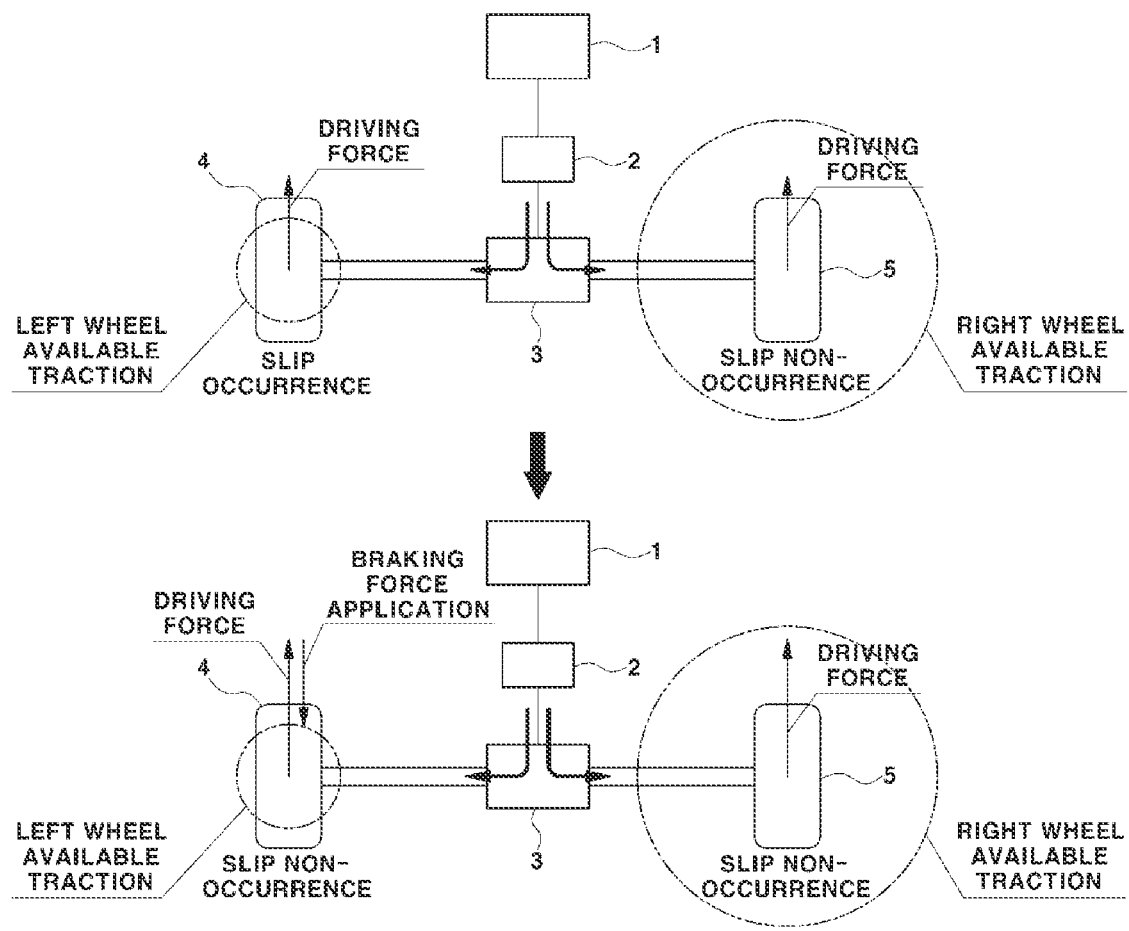
FIG. 2 is a diagram illustrating a wheel slip control state according to the present disclosure.

FIG. 2 is a diagram illustrating the wheel slip control state according to the present disclosure, in which reference numeral 1 refers to the driving device, and reference numeral 2 refers to the reducer.

FIG. 2 illustrates an example of suppressing the occurrence of the slip by applying the braking force to the left wheel 4 in which the slip may occur in a condition where the side wheel slip may occur.

The state where the wheel slip occurs only in the left wheel 4 may be, as an example, the state where the slip occurs only in the left wheel due to the side road surface frictional force on the asymmetric road surface in which the road surface on which the left wheel is grounded is the low frictional road surface compared to the road surface on which the right wheel 5 is grounded, or the state where the slip occurs only in the left wheel due to the side load when the vehicle turns to the left.

When the vehicle turns to the left, the slip does not occur in the right wheel 5, which is the outer wheel, and the slip may occur only in the left wheel 4 which is the inner wheel, and conversely, when the vehicle turns to the right, the slip does not occur in the left wheel 4, which is the outer wheel, and the slip may occur only in the right wheel 5 which is the inner wheel.

Further, when the driving force is distributed to the left wheel 4 and the right wheel 5 of the drive wheel at a ratio of 50:50 in the vehicle mounted with the open differential 3, the slip may occur only in one vehicle wheel when the available traction atone of the left wheel and the right wheel is smaller than the driving force.

As described above, according to the present disclosure, a control unit senses the uneven wheel slip state where the slip occurs in only one vehicle wheel having decreased available traction of the left wheel 4 and the right wheel 5 of the drive wheel to apply the braking force to the vehicle wheel in which the slip occurs such that the vehicle wheel in which the slip occurs may be driven by a force having the magnitude obtained by subtracting the braking force from the driving force transferred from the driving device 1.

As a result, the braking force is applied to only the vehicle wheel in which the slip occurs such that the magnitude of the force obtained by subtracting the braking force from the driving force transferred from the driving device may be smaller than the available traction, thereby suppressing the slip in the corresponding vehicle wheel.

The top drawing in FIG. 2 illustrates a state where the uneven wheel slip occurs, in which it may be seen that the driving force is distributed to the left wheel 4 and the right wheel 5 at a ratio of 50:50, and the driving force having the same magnitude is applied to the left wheel 4 and the right wheel 5 through the open differential 3 via the reducer 2 in the driving device 1.

An example of FIG. 2 illustrates the state where the available traction of the left wheel 4 is decreased compared to that of the right wheel 5, in which the driving force is larger than the available traction in the left wheel 4, such that the slip occurs, whereas the driving force is smaller than the available traction in the right wheel 5, such that the slip does not occur.

According to the present disclosure, if the uneven wheel slip occurs, for example, if the slip occurs only in the left wheel 4, the braking force for suppressing the slip is additionally applied to the vehicle wheel in which the slip occurs, that is, the left wheel 4 having the available traction smaller than the driving force to suppress the slip in the left wheel 4, instead of decreasing the driving force transferred to all of the vehicle wheels.

That is, the driving force and the braking force are simultaneously applied to the left wheel 4, which is the vehicle wheel in which the slip occurs, thereby suppressing the slip from occurring in the left wheel 4.

At this time, when the braking force is applied to the left wheel 4, the slip in the left wheel may be suppressed only when the value obtained by subtracting the braking force from the driving force is smaller than the available traction in the left wheel.

To this end, the driving forces distributed to the left wheel 4 and the right wheel 5 from the driving device 1 are not decreased and maintained as it is, and the braking force, which makes the value obtained by subtracting the braking force from the driving force become a level which may be smaller than the available traction in the left wheel 4, may be applied to only the left wheel.

Alternatively, it is possible to increase the driving forces of the left wheel 4 and the right wheel 5 within the margin of the available traction (may be a value obtained by subtracting the driving force from the available traction) (see the top drawing in FIG. 2) compared to the driving force of the right wheel before the braking force is applied to the left wheel 4 (see the bottom drawing in FIG. 2).

At this time, the braking force application amount of the left wheel is preferably determined such that the value obtained by subtracting the additionally applied braking force from the increased driving force in the left wheel 4 is not larger than the available traction in the left wheel.

As described above, it is possible to suppress the slips in all of the vehicle wheels including the vehicle wheel in which the slip occurs only by additionally applying the braking force having an appropriate magnitude to the vehicle wheel in which the slip occurs in the state of not decreasing and maintaining the driving force as it is.

Further, even if the driving force is rather increased, when the braking force application amount may be controlled such that a difference between the driving force and the braking force applied from the vehicle wheel in which the slip occurs is not larger than the available traction, it is possible to suppress the slip in the vehicle wheel.

While the method for suppressing the slip in the uneven wheel slip state where the slip occurs in the left wheel 4 has been described with reference to FIG. 2, the present disclosure is not limited to the case where the slip occurs in the left wheel, and even in the case of the uneven wheel slip state where the slip occurs only in the right wheel 5, likewise, when the braking force is applied to the right wheel in the same method, the occurrence of the slip in all of the vehicle wheels including the right wheel may be suppressed.

Figure 3:
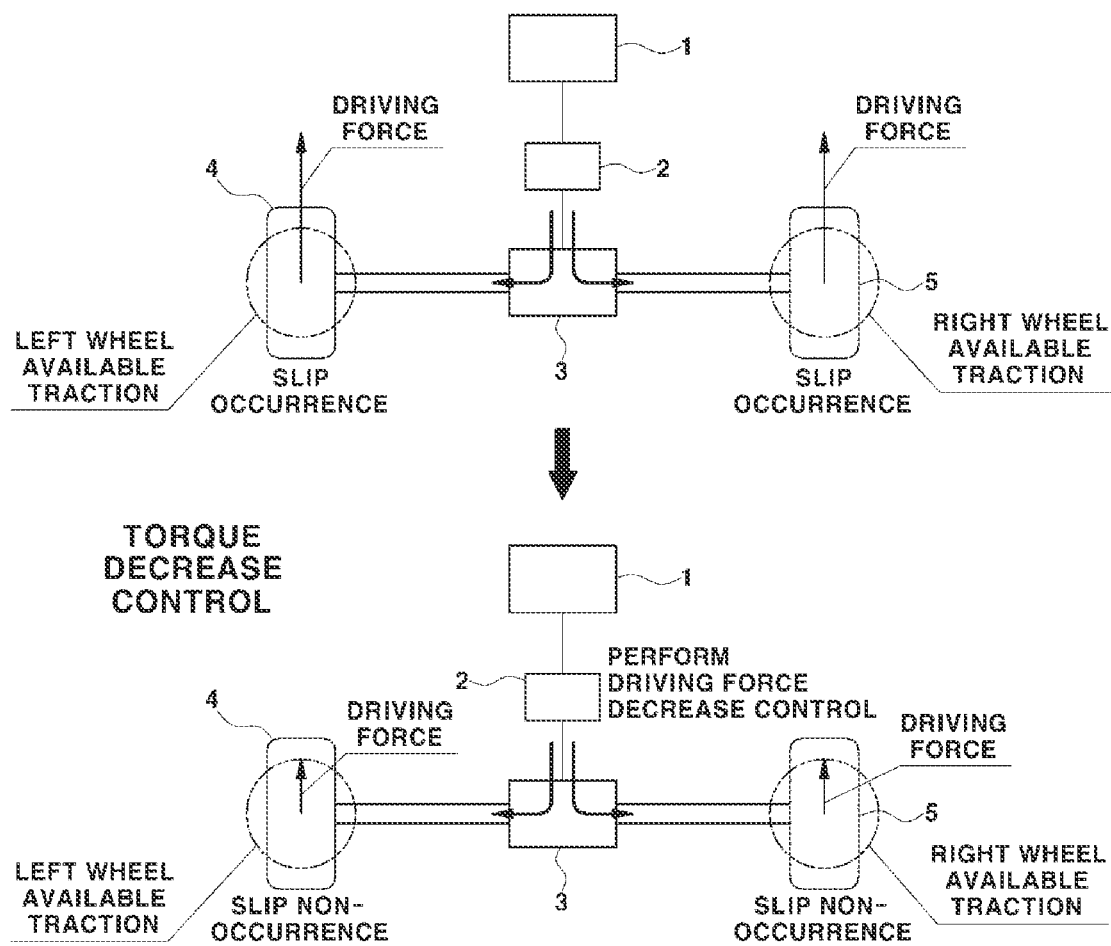
FIG. 3 is a diagram illustrating a control method in a case where the slip occurs both in a left wheel and a right wheel according to the present disclosure.

Meanwhile, FIG. 3 is a diagram illustrating a control method in the case where the slip simultaneously occurs both in the left wheel and the right wheel according to the present disclosure.

Figure 4:
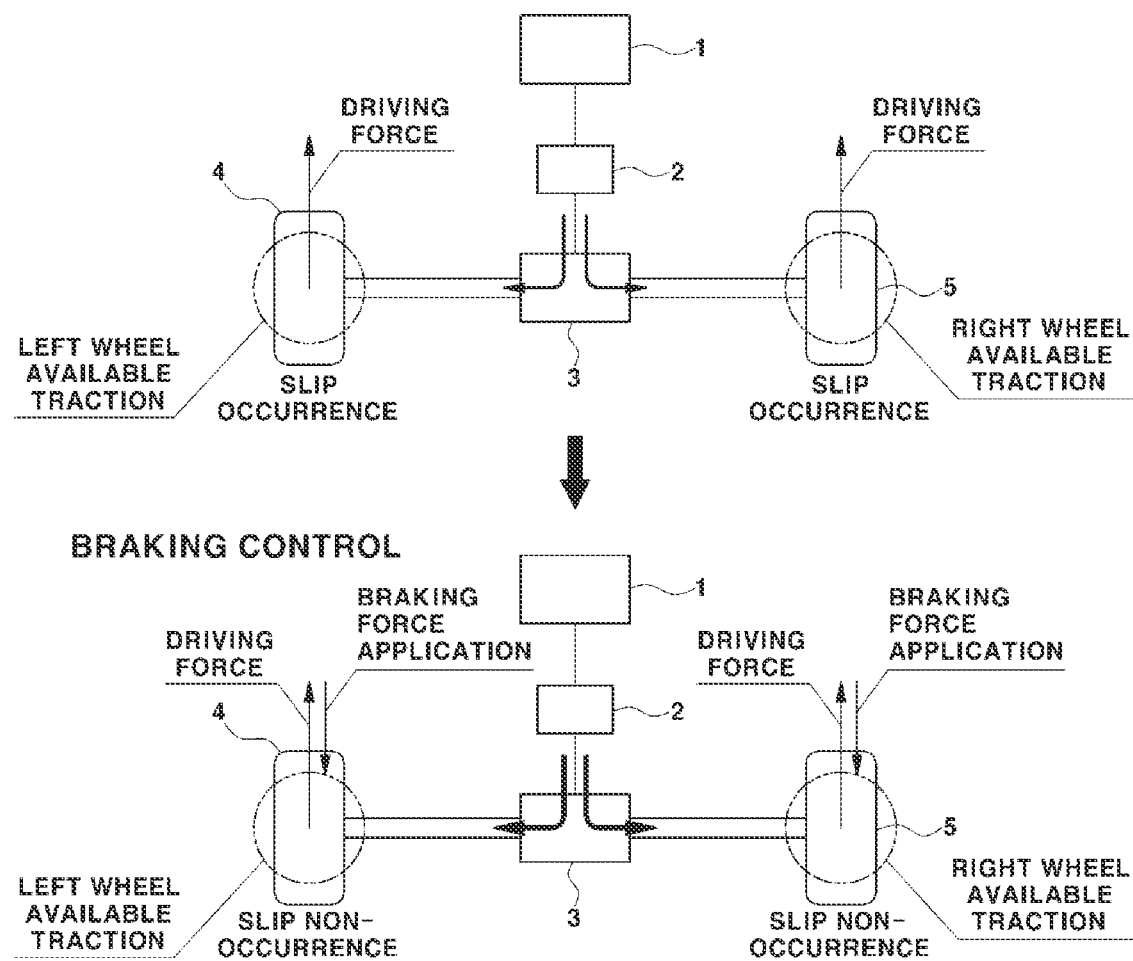
FIG. 4 is a diagram illustrating a control method of a Comparative Example of applying a braking force to both vehicle wheels in the case where the slip simultaneously occurs both in the left wheel and the right wheel.

Further, FIG. 4 is a diagram illustrating a control method of a Comparative Example of applying the braking force to both vehicle wheels if the slip simultaneously occurs both in the left wheel and the right wheel.

The top drawing in FIG. 3 illustrates that when the driving force generated and provided by the driving device 1 is applied to the left wheel 4 and the right wheel 5 through the open differential 3 via the reducer 2 in the vehicle mounted with the open differential 3, all of the available tractions in the left wheel 4 and the right wheel 5 are smaller than the driving force, such that the slip occurs both in the left wheel 4 and the right wheel 5.

As described above, if the slip occurs both in the left wheel 4 and the right wheel 5, for example, when the slip amounts generated by the left wheel and the right wheel are the same as each other or similar to each other with a difference of a predetermined level or less, the present disclosure performs the driving force decrease control of decreasing the driving forces of the driving device 1 applied to the respective vehicle wheels 4, 5 to secure the tractions in all of the vehicle wheels as illustrated in the bottom drawing in FIG. 3, instead of applying the braking force to any one vehicle wheel, in order to suppress the slips of both vehicle wheels.

According to the present disclosure, the decrease in the driving force (driving torque) means the decrease in the driving torque, which is the torque output by the driving device 1 such as an engine, a motor, or the engine and the motor, and the control of decreasing the driving force (driving torque) means the control of decreasing the torque instruction of the driving device generated and output by the control unit.

As described above, if the slip occurs both in the left wheel 4 and the right wheel 5, the present disclosure performs the driving force decrease control, that is, the torque decrease control in order to suppress the slip.

According to the present disclosure, if the slip simultaneously occurs both in the left wheel and the right wheel, the control of decreasing the driving force, that is, the torque decrease control of decreasing the driving torque is similar to the conventional TCS control in that the driving force is decreased to suppress the slip.

However, as will be described later, the present disclosure is different from the conventional TCS control in that the torque (driving force) decrease control based on the equivalent inertia is performed, where the torque decrease control based on the equivalent inertia means the control of decreasing the driving torque based on the equivalent inertia change amount.

According to the present disclosure, the control unit determines the torque (driving force) decrease amount as a value corresponding to the equivalent inertia change amount, and performs the correction decreasing the torque instruction of the driving device 1 according to the determined torque decrease amount during the torque decrease control based on the equivalent inertia.

FIG. 4 illustrates an example in which when the slip occurs both in the left wheel 4 and the right wheel 5, the braking force is applied to all of two vehicle wheels in which the slip occurs, thereby securing the sufficient traction.

As illustrated, it is possible to consider applying the braking force to each of the left wheel 4 and the right wheel 5 in which the slip occurs in order to suppress the wheel slip of the vehicle.

Here, as illustrated in the example of FIG. 2, the braking forces applied to the left wheel 4 and the right wheel 5 may be determined such that the value obtained by subtracting the braking force from the driving force is not larger than the available traction of each vehicle wheel.

However, when the available traction is smaller than the driving force in the left wheel 4 and the right wheel 5, such that the slip occurs both in the vehicle wheels, the application of the braking forces to both the left wheel and the right wheel in order to secure the sufficient traction of the vehicle wheel is not preferable because the energy consumption is larger than the decrease in the driving force, thereby not being economical as well as inefficient, and further, there is a problem such as the decrease in durability due to the excessive use of a brake pad.

Therefore, if the slip occurs both in the left wheel 4 and the right wheel 5, the present disclosure performs the control of decreasing the driving force applied to both vehicle wheels, instead of the method for applying the braking force to both the vehicle wheels.

That is, the present disclosure decreases the torque instruction of the driving device 1 without applying the braking forces to both vehicle wheels, thereby decreasing the torque (driving force) applied to both vehicle wheels, but the present disclosure decreases the torque of the driving device by the decrease amount of the value corresponding to the equivalent inertia change amount.

Figure 5:
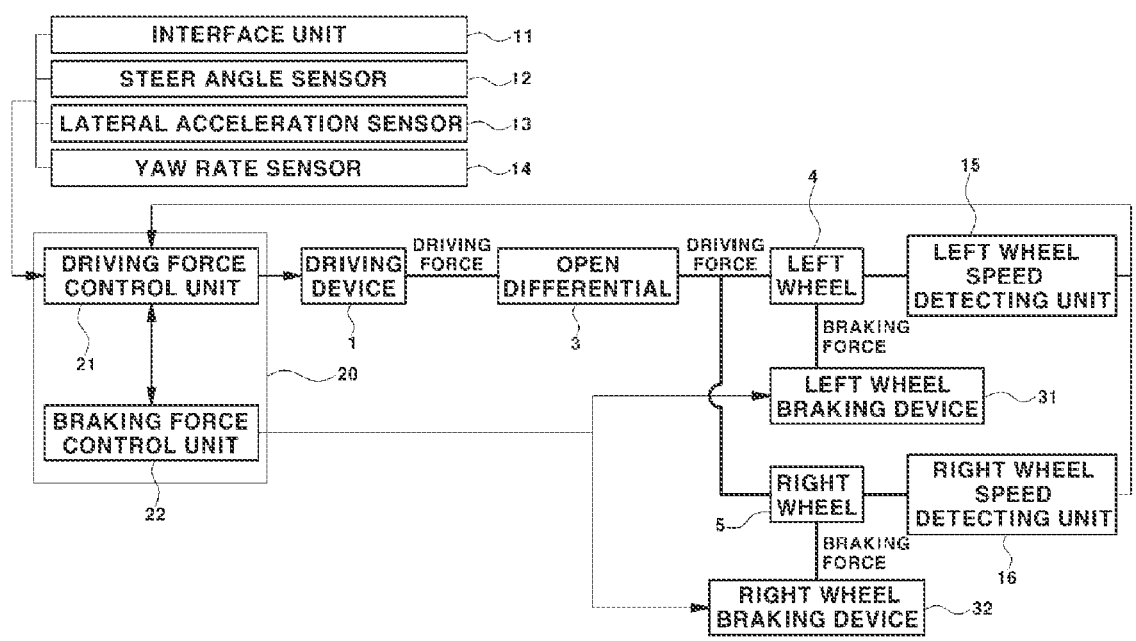
FIG. 5 is a block diagram illustrating a configuration of the vehicle in which a wheel slip control process of a vehicle according to the present disclosure is performed.

FIG. 5 is a block diagram illustrating a configuration of the vehicle in which a wheel slip control process of the vehicle according to the present disclosure is performed.

As illustrated, the vehicle includes a control unit 20 configured to perform the wheel slip control according to the present disclosure, the driving device 1 configured to drive the vehicle, the open differential 3 configured to transfer the driving force of the driving device 1 to the vehicle wheels 4, 5, braking devices 31, 32 configured to apply the braking forces to the respective vehicle wheel 4, and speed detecting units 15, 16 configured to detect the rotating speed of the respective vehicle wheels 4, 5.

Here, the driving device 1 may be an engine (in the case of the internal combustion engine vehicle), a motor (battery electric vehicle, fuel cell vehicle), or the engine and the motor (in the case of hybrid vehicle) according to the vehicle.

The control unit 20 includes a driving force control unit 21 configured to control the driving force of the vehicle, and a braking force control unit 22 configure to control the braking force of the vehicle, in which the driving force control unit 21 controls an operation of the driving device 1 by generating and outputting the torque instruction.

Further, the braking force control unit 22 controls the operations of the braking devices 31, 32 installed on the respective vehicle wheels 4, 5, in which the braking devices 31, 32 may be frictional braking devices, and specifically, known wheel brakes as the hydraulic braking devices.

According to the present disclosure, the driving force control unit 21, as the top level control unit of the vehicle, may be a control unit within the vehicle configured to control the operation of the driving device 1 by generating and outputting the torque instruction of the engine, the motor, or the engine and the motor, which is the driving device 1.

For example, the driving force control unit 21 may be a vehicle control unit (VCU) or a hybrid control unit (HCU), which is the top level control unit in an electric vehicle or a hybrid vehicle.

The braking force control unit 22 may be a known brake control unit configured to individually control the operations of the braking devices 31, 32 installed on the respective vehicle wheels 4, 5.

The wheel slip control according to the present disclosure is performed in a cooperation control of the driving force control unit 21 and the braking force control unit 22, and the driving force control unit 21 performs the driving force control and correction for the wheel slip control as well as sensing the slips of the respective vehicle wheels 4, 5, and performs the braking force control request to the braking force control unit 22 when the uneven wheel slip is sensed.

Here, as described later, the driving force correction means the correction of the torque instruction of the driving device 1 in order to decrease the driving force.

According to the present disclosure, when the vehicle wheel is in the uneven wheel slip state where the slip occurs only in one of the left wheel 4 and the right wheel 5 while the vehicle travels, the braking force control unit 22 controls the operations of the braking devices 31, 32 such that the braking force may be applied to only the vehicle wheel in which the slip occurs according to the request of the driving force control unit 21, which is the top level control unit.

At this time, the braking force control unit 22 controls the operations of the braking devices 31, 32 installed on the vehicle wheels in which the slip occurs such that the braking force may be applied to only the corresponding vehicle wheel.

Further, according to the present disclosure, the driving force control unit 21 may generate and transfer the torque instructions (braking torque instructions) of the braking devices 31, 32 to the braking force control unit 22 in the cooperation control process with the braking force control unit 22, or the braking force control unit 22 may receive necessary information from the driving force control unit 21 to generate and output the torque instructions of the braking devices 31, 32 for the braking force control.

In the configuration of the device illustrated in FIG. 5, the driving device 1 generates and outputs the driving force (driving torque) according to the torque instruction output by the driving force control unit 21, and at this time, the driving force (driving torque) is transferred to the left wheel 4 and the right wheel 5 through the open differential 3 via the reducer (not illustrated).

At this time, the driving force is distributed to the left wheel 4 and the right wheel 5 at a ratio of 50:50 by the open differential 3, and the vehicle mounted with the open differential 3 may equally decrease the driving forces applied to the left wheel 4 and the right wheel 5 by decreasing the driving force output by the driving device 1.

If the slip occurs both in the left wheel 4 and the right wheel 5, particularly, if the same or similar amount of slip occurs both in the left wheel and the right wheel, the present disclosure decreases the driving force of the driving device 1, thereby simultaneously suppressing the slips of both vehicle wheels.

The speed detecting unit includes a left wheel speed detecting unit 15 configured to detect the rotating speed (wheel speed) of the left wheel 4, and a right wheel speed detecting unit 16 configured to detect the rotating speed of the right wheel 5, and the respective speed detecting units 15, 16 may be known wheel speed sensors installed on each of the left wheel 4 and the right wheel 5.

According to the present disclosure, the driving force control unit 21 of the control unit 20 determines whether the slip of the vehicle wheel occurs from signals of the left wheel speed detecting unit 15 and the right wheel speed detecting unit 16, and particularly, determines whether the slip occurs only in one of the left wheel 4 and the right wheel 5, or whether the slip occurs in both sides (both the left wheel 4 and the right wheel 5).

Further, referring to FIG. 5, the vehicle may be further installed with a steer angle sensor 12 configured to detect a steer angle according to a steering wheel operation of the driver, a lateral acceleration sensor 13 configured to detect lateral acceleration of the vehicle, and a yaw rate sensor 14 configured to detect a yaw rate of the vehicle, and all of the sensors are used to detect vehicle state information necessary for the wheel slip control process according to the present disclosure.

Further, as described later, the vehicle may additionally include an interface unit 11 used for the driver to select and input the ON or OFF of the wheel slip control function according to the present disclosure.

The interface unit 11 is applicable as long as it is a means in which the driver may operate the ON and OFF of the control function.

The interface unit 11 may be connected to the driving force control unit 21 of the control unit 20, and therefore, when the driver performs the ON and OFF operation, the ON and OFF operation signals by the driver may be input to the driving force control unit 21 of the control unit 20 from the interface unit 11.

Figure 6:
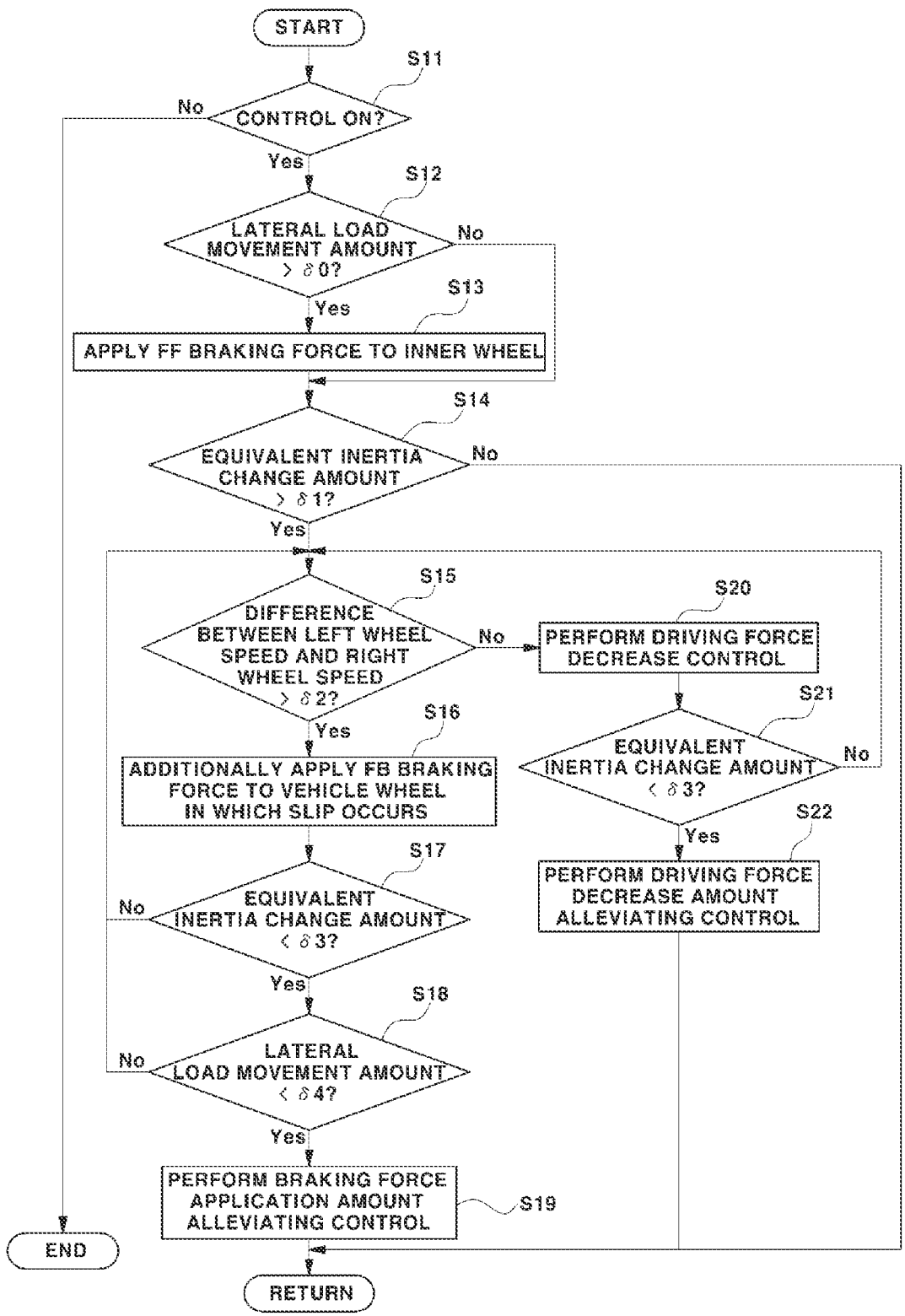
FIGS. 6 and 7 are flowcharts illustrating a wheel slip control method according to an exemplary embodiment of the present disclosure.
Figure 7:
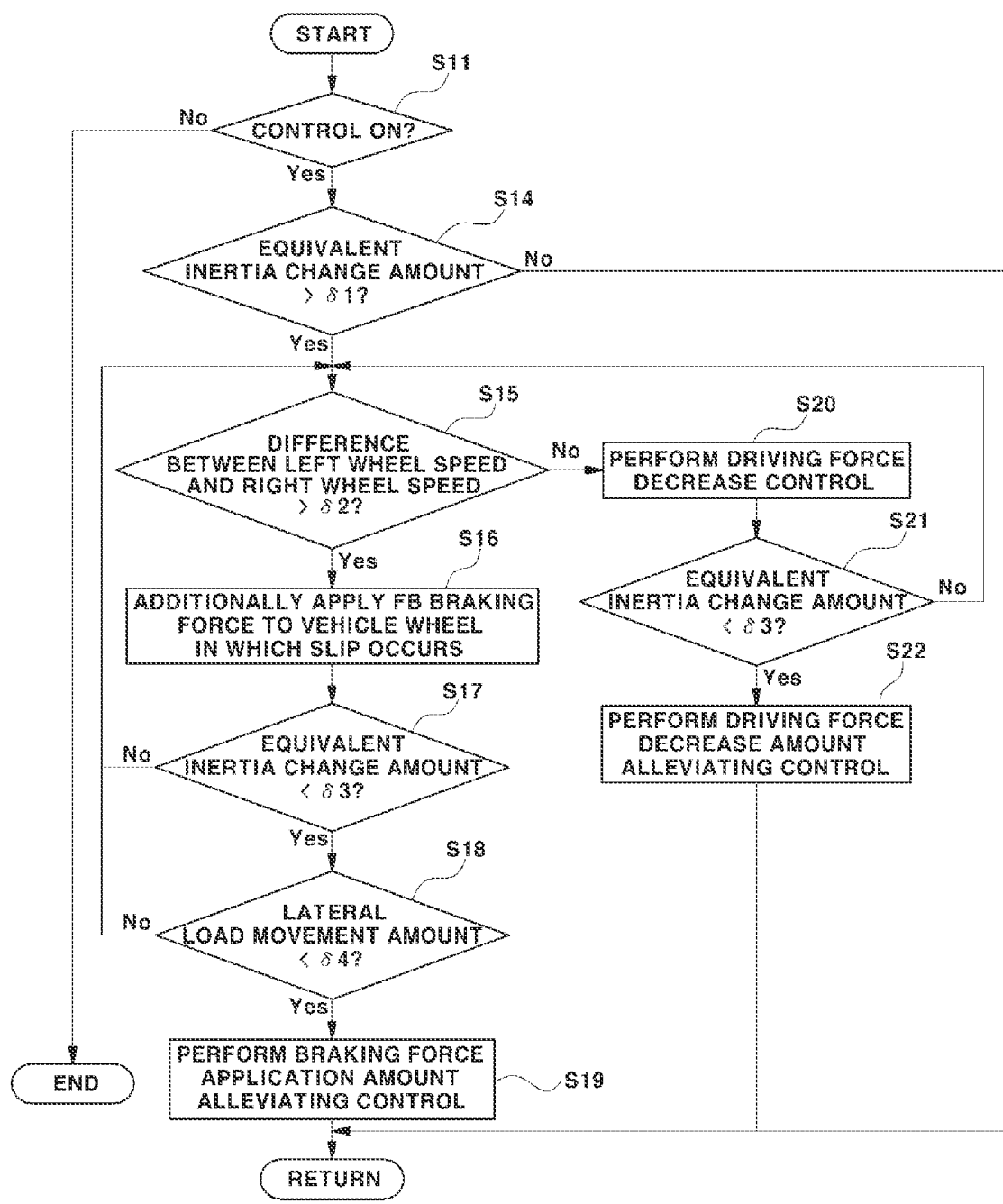

FIGS. 6 and 7 are flowcharts illustrating the wheel slip control method according to an exemplary embodiment of the present disclosure, in which FIG. 6 is a flowchart illustrating a wheel slip basic counteraction mode as an exemplary embodiment of the present disclosure, and FIG. 7 is a flowchart illustrating a wheel slip post counteraction mode as another exemplary embodiment of the present disclosure.

The embodiment comprising the method of the wheel slip basic counteraction mode and the embodiment comprising the method of the wheel slip post counteraction mode may be adopted as the wheel slip control method in the present disclosure.

The wheel slip basic counteraction mode of the two counteraction modes is a mode including the control process of applying the braking force (corresponding to steps S12 and S13 in FIG. 6) if the lateral load movement having the reference value or more occurs when the wheel slip is not detected by the equivalent inertia change amount.

In contrast, the wheel slip post counteraction mode is a mode performing the control of additionally applying the braking force together with the driving force to the vehicle wheel in which the slip occurs when the uneven wheel slip is detected by the equivalent inertia change amount.

The wheel slip post counteraction mode is advantageous in terms of the durability of a brake pad compared to the wheel slip basic counteraction mode, but the wheel slip basic counteraction mode is advantageous compared to the wheel slip post counteraction mode in terms of the reactivity and stability of the vehicle behavior.

First, describing the wheel slip basic counteraction mode, as illustrated in FIG. 6, the wheel slip control process according to the present disclosure determines whether the control unit 20 is in the state where the control function becomes ON (S11), and is performed if the control unit 20 is in the control ON state.

That is, if the driver turns on the control function through the interface unit 11 in the vehicle, the subsequent wheel slip control process is performed, and in the step S11 illustrated in FIG. 6, it is determined that the control unit 20 is in the control ON state and then the subsequent wheel slip control process is performed.

If the control unit 20 is not in the control ON state in the step S11, that is, if the control unit 20 is in the control OFF state, the control logic is terminated.

Further, in the case of the control ON state as described above, the driving force control unit 21 of the control unit 20 calculates the vehicle lateral load movement amount from current vehicle traveling information collected by the vehicle.

Here, the vehicle traveling information may include steer angle information according to the steering wheel operation of the driver, lateral angular speed information and yaw rate information of the vehicle, and wheel speed (vehicle wheel speed) information.

Such information may be detected through the sensors, and the steer angle may be detected by the steer angle sensor 12, the lateral acceleration of the vehicle may be detected by the lateral acceleration sensor 13, and the yaw rate and the wheel speed of the vehicle may be detected by the yaw rate sensor 14 and the speed detecting units (wheel speed sensors) 15, 16, respectively.

As described above, the driving force control unit 21 of the control unit 20 may receive the information about the steer angle, the lateral acceleration and the yaw rate of the vehicle, and the wheel speed detected by the sensors to calculate the vehicle lateral load movement amount, and the lateral load movement amount is a control variable widely used for the vehicle control in the art, such that a detailed description of the calculating method thereof will be omitted.

As an example, the following reference discloses the method capable of estimating the lateral load movement amount. Cho, Wanki, et al. "Estimation of tire forces for application to vehicle stability control." IEEE Transactions on Vehicular Technology 59.2 (2009): 638-649.

Subsequently, the driving force control unit 21 compares the lateral load movement amount calculated as described above with a predetermined first movement amount threshold ($\delta 0$) (S12), and subsequently, determines that the uneven load of a predetermined level or more occurs in the vehicle when the vehicle turns if the lateral load movement amount is larger than the first movement amount threshold ($\delta 0$) to request the braking force application from the braking force control unit 22.

Subsequently, the braking force control unit 22 applies the braking force to only the vehicle wheel corresponding to the inner wheel when the vehicle turns according to the request of the driving force control unit 21 (S13).

That is, when the vehicle lateral load movement amount exceeds a predetermined level during traveling, the braking force control unit 22 performs a feed forward (FF) uneven braking control of applying a predetermined braking force to only the inner wheel by the cooperative control of the driving force control unit 21 and the braking force control unit 22 of the control unit 20.

According to the exemplary embodiment of the present disclosure, the subsequent step after a step S14 illustrated in FIG. 5 is a control process performed to suppress the wheel slip after sensing the wheel slip in the vehicle through the equivalent inertia information, and the step S12 and the step S13 are uneven braking control processes of applying the feed forward (FF) braking force to the inner wheel to suppress the occurrence of the wheel slip when the uneven load occurs even if the wheel slip is not sensed through the equivalent inertia information.

As described above, the present disclosure applies the uneven braking force when the uneven load having the reference value or more occurs even if the wheel slip is not sensed through the equivalent inertia information to be described later, a mode further including the step S12 and the step S13 is the wheel slip basic counteraction mode, and a mode excluding the step S12 and the step S13 is the wheel slip post counteraction mode.

According to the exemplary embodiment of the present disclosure, the magnitude of the feed forward (FF) braking force applied to the inner wheel upon the feed forward uneven braking control may be determined as a value corresponding to the calculated lateral load movement amount in the driving force control unit 21 or the braking force control unit 22 of the control unit 20.

At this time, the magnitude of the feed forward braking force applied to the inner wheel in the control unit 20 is set to a larger value as the lateral load movement amount increases.

Subsequently, in the case of the state where the uneven braking control is performed, as illustrated in FIG. 5, the control unit 20 performs the step S14, whereas the control unit 20 directly performs the step S14 without performing the uneven braking control if the lateral load movement amount is the first movement amount threshold ($\delta 0$) or less.

In the step S14, the driving force control unit 21 estimates real-time equivalent inertia information of the driving system based on real-time operation information of the driving system, and determines whether the slip occurs in the current vehicle wheel based on the estimated equivalent inertia information of the driving system.

Here, the equivalent inertia information of the driving system may include the real-time equivalent inertia value of the driving system and the equivalent inertia change amount obtained by the equivalent inertia, and at this time, the equivalent inertia change amount may be defined by a difference between the equivalent inertia value of the driving system obtained in real time and a predetermined basic equivalent inertia value.

The operation information of the driving system necessary for estimating the equivalent inertia information may include the torque (driving force) instruction of the previous control cycle of the driving device 1 configured to drive the vehicle, and the speed information of the driving system.

As an example, in the motor driven vehicle mounted with the motor as the driving device 1, the torque instruction may be a driving torque (driving force) instruction, that is, the motor torque instruction for the motor.

The speed of the driving system may be the rotating speed of the driving element existing in the path through which the driving force is transferred from the driving device 1 configured to drive the vehicle to the drive wheel, and may be real-time rotating speed information of the driving system detected by the speed detecting unit as a measurement value.

Specifically, the speed of the driving system may be a predetermined single speed among an engine speed, a motor speed, a transmission input shaft rotating speed, a transmission output shaft rotating speed, a drive wheel rotating speed, and the rotating speed of an integrated starter and generator (ISG) which is a starting generator connected to the engine.

According to the exemplary embodiment of the present disclosure, when the speed of the driving system is the rotating speed of the drive wheel, the speed detecting unit is the speed detecting units (wheel speed sensors) 15, 16 installed on the drive wheel.

At this time, the speed of the driving system may be a higher speed value of the left wheel speed detected by the left wheel speed detecting unit 15 and the right wheel speed detected by the right wheel speed detecting unit 16 or an average value of the left wheel speed and the right wheel speed.

Further, according to the present disclosure, when the speed of the driving system is the rotating speed of the driving device 1, the speed detecting unit may be a known engine RPM sensor configured to detect the engine speed or a known resolver configured to detect the motor speed.

As described above, according to the present disclosure, the rotating speed of the driving element related to the speed of the drive wheel may be used as the speed of the driving system configured to estimate the equivalent inertia information.

Further, according to the exemplary embodiment of the present disclosure, the driving force control unit 21 of the control unit 20 may calculate the equivalent inertia of the driving system by a value obtained by dividing the torque instruction of the previous control cycle by an angular acceleration of the driving system.

The driving force control unit 21 may basically calculate the equivalent inertia value using the relationship of Equation 1 below, where '$T_q$' refers to the torque, 'I' refers to the equivalent inertia, and '$\alpha$' refers to the angular acceleration which is a speed (angular velocity) differential value.

$$Tq = I \times \alpha \qquad \text{Equation 1}$$

According to the exemplary embodiment of the present disclosure, as a simple example, the driving force control unit 21 may calculate the necessary equivalent inertia (I) from the angular acceleration ($\alpha$) obtained by the speed of the driving system and the driving torque ($T_q$) transferred through the driving system.

Here, the speed of the driving system may be the rotating speed of the driving system detected by the speed detecting unit, that is, the sensor such as the resolver or the wheel speed sensor, and the driving torque may be the torque instruction of the driving device.

More specifically, the torque ($T_q$) in the Equation 1 may be the torque instruction of the previous control cycle as a final torque instruction of the driving device 1, and if the driving force decrease control to be described later is performed and thus the torque correction is performed based on previous equivalent inertia information in the previous control cycle, the torque instruction of the previous control cycle may be the corrected torque instruction.

Of course, the torque instruction not corrected is a general torque instruction generated by the driving force control unit 21 for the traveling of the vehicle according to the operation input, the cruise mode input, or the like of the driver.

According to the present disclosure, the equivalent inertia accurately means vehicle equivalent rotation inertia, and refers to an inertia value intending to maintain the current rotating state as the value related to the weight of the vehicle, and the actual vehicle is an object conducting a linear motion rather than a rotating object, such that it is general to discuss the inertia, that is, the mass.

However, from the perspective of the driving force provision source, the mass itself of the vehicle acts as a load in accelerating and decelerating the angular velocity, and a value obtained by converting the mass value corresponding to the load in view of a rotating system is the vehicle equivalent rotation inertia.

Exemplarily describing the derivation of the equivalent inertia (equivalent rotation inertia) in the relationship between the driving force (driving torque) and the angular acceleration, first, if 'F=m×a' is substituted into the acceleration state of the vehicle, the F corresponds to the driving force, the m corresponds to the mass or the inertia of the vehicle, and the a corresponds to the longitudinal acceleration of the vehicle.

When converting 'F=m×a' in view of the rotating system, '$T_q = I \times \alpha$' becomes, and the $T_q$ refers to the driving torque, the I refers to the equivalent inertia, and the $\alpha$ refers to the angular acceleration of the rotation system of the vehicle.

The equivalent inertia may be simply calculated using '$I = T_q/\alpha$', and for example, the equivalent inertia may be obtained by 'driving torque/angular acceleration', where a wheel angular acceleration, a motor angular acceleration, an engine angular acceleration, or the like may be used as the angular acceleration.

The calculated equivalent inertia value is rapidly changed when the wheel slip occurs; when the equivalent inertia is calculated by the formula of '$I = T_q/\alpha$', the equivalent inertia may be obtained by the same formula even in the situation where the wheel slip does not occur; and if the wheel slip occurs, the wheel angular acceleration largely increases even if the wheel slip speed does not largely increase.

Therefore, when dividing the same torque ($T_q$) value into the largely increased wheel angular acceleration ($\alpha$), the momentarily decreased equivalent inertia (I) is calculated, and at this time, a change in the equivalent inertia (I) is faster than a change in the wheel slip speed.

As a result, according to the present disclosure, when the equivalent inertia information is calculated using the operation information of the driving system, that is, the torque instruction of the previous control cycle, which is the final torque instruction, and the driving system speed information according to the Equation 1, the driving force control unit 21 may determine whether the slip of the vehicle wheel occurs using the calculated equivalent inertia information.

The entire equivalent inertia of the vehicle when the wheel slip does not occur may be obtained by the final torque instruction and the wheel angular acceleration as expressed in the Equation 1, and the thus obtained equivalent inertia value of the vehicle is relatively larger than the equivalent inertia value when the wheel slip occurs.

The reason is that when the wheel slip occurs, the driving torque accelerates only the drive wheel rather than accelerating the vehicle, and as a result, when considering such a relationship, it may be determined that the vehicle wheel is in the wheel slip state when the calculated equivalent inertia of the vehicle is decreased to a predetermined value or less.

Therefore, according to the present disclosure, the driving force control unit 21 calculates the equivalent inertia change amount which is a difference between the equivalent inertia value of the driving system obtained in real time and the predetermined basic equivalent inertia value, and compares the equivalent inertia change amount with a predetermined first change amount threshold ($\delta 1$) (S14).

Here, the first change amount threshold ($\delta 1$) is a reference value previously set to determine whether the slip of the vehicle wheel occurs by a comparison with the real-time equivalent inertia change amount, and the driving force control unit 21 determines that the slip of the vehicle wheel (drive wheel) occurs when the calculated equivalent inertia change amount is larger than the first change amount threshold ($\delta 1$).

Subsequently, the driving force control unit 21 compares a difference between the rotating speed of the left wheel (hereinafter, referred to as 'left wheel speed') detected by the left wheel speed detecting unit 15 and the rotating speed of the right wheel (hereinafter, referred to as 'right wheel speed') detected by the right wheel speed detecting unit 16 with a predetermined threshold speed difference ($\delta 2$) (S15).

If the difference between the left wheel speed and the right wheel speed is larger than the threshold speed difference ($\delta 2$), it is determined that the driving force control unit 21 is in the uneven wheel slip state where the slip occurs in one of the left wheel and the right wheel.

At this time, the driving force control unit 21 may recognize that the slip occurs in the fast vehicle wheel of the left wheel and the right wheel.

As an example, the uneven wheel slip state may be the st to where the slip a occurs only in one vehicle wheel due to the uneven road surface frictional force on the asymmetric road surface having different frictional coefficients between the road surface on which the right wheel is grounded and the road surface on which the left wheel is grounded, or the state where the slip occurs only in the left wheel due to the uneven load when the vehicle turns to the left.

Subsequently, if it is determined that the vehicle wheel is in the uneven wheel slip state, in the state where the driving force is applied to the left wheel 4 and the right wheel 5, the driving force control unit 21 performs a feedback uneven braking control of additionally applying a feedback (FB) braking force for suppressing the slip to only the vehicle wheel in which the slip occurs through the cooperative control with the braking force control unit 22.

At this time, the vehicle wheel in which the slip occurs may be determined from the detected left wheel speed and right wheel speed, and the vehicle wheel, which rotates at a higher speed, of the left wheel and the right wheel, that is, the vehicle wheel, which rotates at a larger speed, of the left wheel and the right wheel is the vehicle wheel in which the slip occurs.

When the slip occurs in one of the left wheel 4 and the right wheel 5, the speed of the vehicle wheel in which the slip occurs is momentarily increased, and at this time, the equivalent inertia change amount is also momentarily increased.

When the feedback (FB) braking force is applied to the vehicle wheel in which the slip occurs in the uneven wheel slip state, it is possible to decrease the slip occurring in the corresponding vehicle wheel.

According to the exemplary embodiment of the present disclosure, when the feed forward (FF) braking force is applied from the step S13, the control unit additionally applies the feedback (FB) braking force in addition to the feed forward braking force in the step S16, and in the state where the feed forward (FF) braking force is not applied, only the feedback (FB) braking force is applied in the step S16.

According to the exemplary embodiment of the present disclosure, the magnitude of the feedback (FB) braking force applied to the vehicle wheel in which the slip occurs (hereinafter, referred to as 'slip occurrence vehicle wheel') may be determined as a value corresponding to the current equivalent inertia change amount in the driving force control unit 21 or the braking force control unit 22 of the control unit 20.

Alternatively, the feedback (FB) braking force may be determined as a value corresponding to a speed difference (speed error) between the slip occurrence vehicle wheel and the slip non-occurrence vehicle wheel by setting the speed of the vehicle wheel in which the slip does not occur (hereinafter, referred to as 'slip non-occurrence vehicle wheel') as a target speed.

That is, the feedback braking force may be determined as a control input value at which the speed of the slip occurrence vehicle wheel tracks the speed of the slip non-occurrence vehicle wheel, and when the feedback braking force is applied to the slip occurrence vehicle wheel, the speed difference between two vehicle wheels is gradually decreased.

As described above, when it is determined as the uneven wheel slip state, the control unit 20 may perform a feedback uneven braking control of decreasing the speed difference between the slip occurrence vehicle wheel and the slip non-occurrence vehicle wheel by applying the feedback braking force to the slip occurrence vehicle wheel.

Further, as described above, instead of performing the feedback uneven braking control of applying the braking force allowing the speed of the slip occurrence vehicle wheel to track the speed of the slip non-occurrence vehicle wheel to the slip occurrence vehicle wheel by setting the speed of the slip non-occurrence vehicle wheel as the target speed, the control unit 20 may perform the feedback uneven braking control of applying the braking force allowing the speed of the slip occurrence vehicle wheel to track the speed of the slip non-occurrence vehicle wheel to which the kinematic characteristic is reflected to the slip occurrence vehicle wheel by setting the speed of the slip non-occurrence vehicle wheel to which the kinematic characteristics of the vehicle is reflected as the target speed.

Figure 8:
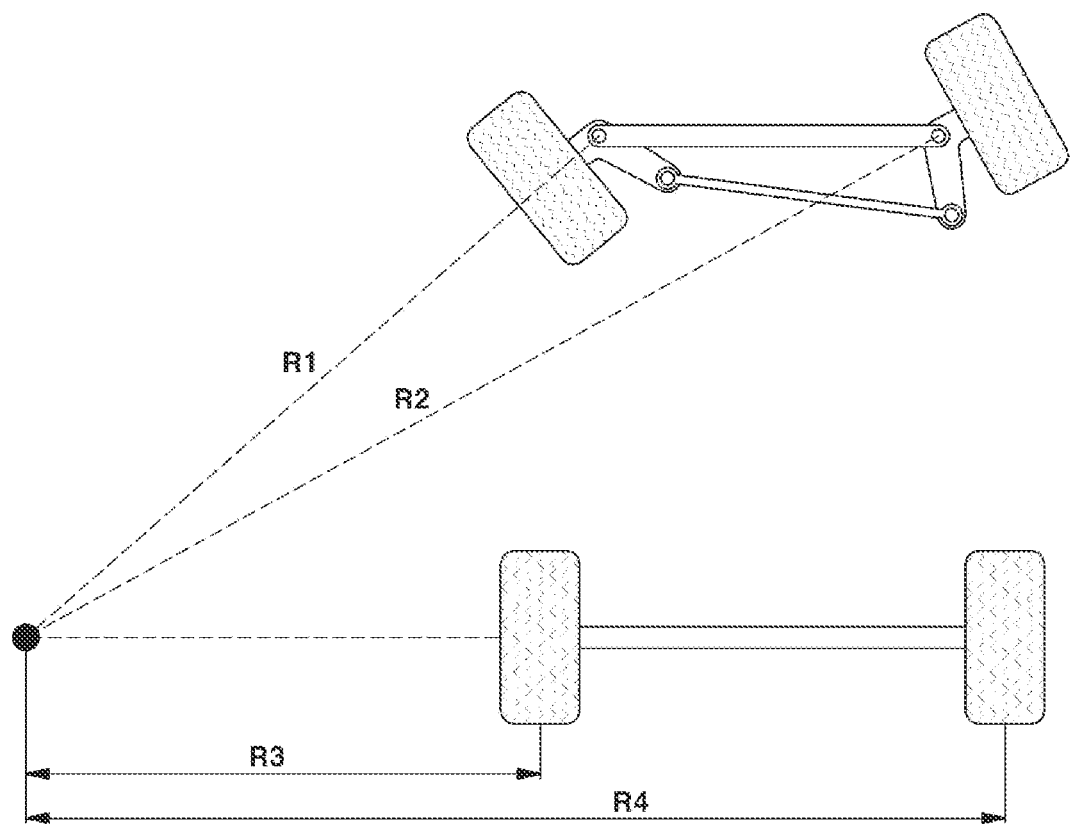
FIG. 8 is a diagram illustrating the vehicle Ackerman geometry kinematics of a turning vehicle.

FIG. 8 is a diagram illustrating vehicle Ackerman geometry kinematics of a turning vehicle, and $R_1$, $R_2$, $R_3$, and $R_4$ in FIG. 8 refer to a turning radius of each vehicle wheel, and are related to the steer angle, where the steer angle may be an Ackerman steer angle.

When the radius of the tire refers to r, a linear speed of each vehicle wheel refers to $V_i$, a rotating speed of each vehicle wheel refers to $\omega_i$, and a vehicle yaw rate refers to $\psi$, the yaw rate is expressed by Equation 2 below.

$$\frac{V_1}{R_1} = \frac{V_2}{R_2} = \frac{V_3}{R_3} = \frac{V_4}{R_4} = \psi \qquad \text{Equation 2}$$

The relationship between the respective vehicle wheel speeds and the relationship with the vehicle yaw rate are expressed by Equation 3 below by the relationship of $V_i = \omega_i \times r$.

$$\frac{\omega_1 r}{R_1} = \frac{\omega_2 r}{R_2} = \frac{\omega_3 r}{R_3} = \frac{\omega_4 r}{R_4} = \psi \qquad \text{Equation 3}$$

Referring to the Equation 3, it is possible to know the rotating speed relationship between the inner wheel and the outer wheel when the vehicle turns, and if the uneven wheel slip occurs when the vehicle turns, in the drawing, the speed of the slip occurrence vehicle wheel refers to $\omega_1$, which is the inner wheel speed, and the speed of the slip non-occurrence vehicle wheel refers to $\omega_2$, which is the outer wheel speed; and it is possible to know the relationship between the outer wheel speed, which is the target speed upon the feedback uneven braking control and the inner wheel speed tracking the outer wheel speed.

Meanwhile, the driving force control unit 21 determines whether the current vehicle state reaches a slip suppress alleviating condition based on the equivalent inertia change amount, which is the current equivalent inertia information of the driving system, and the vehicle lateral load movement amount obtained by the vehicle traveling information.

In this process, the driving force control unit 21 compares the current equivalent inertia change amount with a predetermined second change amount threshold (δ3) as the slip suppress alleviating determination reference (S17), and at this time, subsequently, the driving force control unit 21 compares the vehicle lateral load movement amount with a predetermined second movement amount threshold (δ4), when the equivalent inertia change amount is decreased to a value less than the second change amount threshold (δ3) (S18).

At this time, when the equivalent inertia change amount is less than the second change amount threshold (δ3), the vehicle lateral load movement amount is less than the second movement amount threshold (δ4), the driving force control unit 21 determines that the current vehicle state satisfies the slip suppress alleviating condition to start a braking force application amount alleviating control (S19).

According to the exemplary embodiment of the present disclosure, the second movement amount threshold (δ4) for determining the slip suppress alleviating condition may be previously determined as a value smaller than the first movement amount threshold (δ0) for determining the feed forward uneven braking force application condition in the step S11.

According to the exemplary embodiment of the present disclosure, when it is determined that the current vehicle state satisfies the slip suppress alleviating condition, the driving force control unit 21 may decrease the braking force (feedback uneven braking force) applied to the slip occurrence vehicle wheel by a predetermined amount through the cooperative control with the braking force control unit 22, and then return to the step S11 to repeat the processes of the steps S11 to S19 again.

According to the exemplary embodiment of the present disclosure, the driving force control unit 21 and the braking force control unit 22 decrease the braking force applied to the slip occurrence vehicle wheel by the predetermined setting amount again every control cycle in the steps S11 to S19, when repeating the steps S11 to S19 again.

Meanwhile, when the equivalent inertia change amount is the second change amount threshold (δ3) or more in the step S17, or the lateral load movement amount is the second movement amount threshold (δ4) or more in the step S18, the process is moved to the step S15.

At this time, when a difference between the left wheel speed and the right wheel speed is larger than the threshold speed difference (δ2) in the step S15, the uneven braking control of additionally applying the feedback braking force to only the slip occurrence vehicle wheel in the step S16 is continuously performed.

Further, when the equivalent inertia change amount exceeds the first change amount threshold (δ1) in the step S14 but a difference between the left wheel speed and the right wheel speed is threshold speed difference (δ2) or less in the step S15, the driving force control unit 21 of the control unit 20 determines that the slip occurs both in the left wheel 4 and the right wheel 5, and in this case, decreases the torque instruction of the driving device 1 to decrease the driving force.

That is, when it is determined that the slip of the vehicle wheel occurs based on the equivalent inertia in the step S14 but the speed difference between the left wheel and the right wheel is the threshold speed difference or less in the step S15, it is determined that the wheel slip occurs both in the vehicle wheels rather than the uneven wheel slip state.

As described above, if the slip occurs both in the left and right vehicle wheels rather than the uneven wheel slip, the control unit 20 performs the driving force decrease control of decreasing the driving force of the driving device 1 in a step S20 without applying the braking force to the vehicle wheel (S20).

Further, the step S17 and the step S18 are in the states where the FB braking force in the step S16, which is the previous step, is applied to the slip occurrence vehicle wheel. Then, as described above, if the answers are 'No' for the step S17 and the step S18, the process is moved to the step S15, and when the speed difference between the left wheel and the right wheel is the threshold speed difference or less in the step S15, the driving force decrease control in the step S20 may be performed.

That is, the driving force decrease control in the step S20 may also be additionally performed in the FB braking force application state in the step S16, and conversely, the process returns after steps S21 and S22 are performed while the driving force decrease control is performed in the step S20, and then the FB uneven braking force may also be applied in the step S16 through the steps S11 to S15.

The decrease in the driving force of the driving device in the step S20 means the decrease in the torque output by the driving device, and further, the decrease in the torque output by the driving device means the correction decreasing the torque instruction of the driving device.

That is, according to the present disclosure, the driving force control unit 21 of the control unit 20 performs the correction decreasing the torque instruction of the driving device 1 in order to decrease the driving force, and at this time, the torque instruction correction amount meaning the driving force decrease amount may be set by a function of the equivalent inertia change amount.

As a result, the driving force control unit 21 of the control unit 20 determines the torque instruction correction amount as the value corresponding to the equivalent inertia change amount, then performs the correction decreasing the torque instruction by the determined torque instruction correction amount, and then outputs the corrected torque instruction such that the driving of the driving device 1 is controlled by the corrected torque instruction.

As a result, when the slip occurs both in the vehicle wheels, the torque instruction is corrected based on the equivalent inertia information such that the torque and driving force output by the driving device 1 are decreased.

As the related patent application, there may be Korean Patent Application No. 10-2019-0092527 (Jul. 30, 2019) (hereinafter, referred to as 'Patent Application 1'), where the wheel slip control method of the vehicle includes a process of estimating the equivalent inertia information of the driving system based on the operation information of the driving system by the control unit (corresponding to the driving force control unit according to the present disclosure).

Here, the control unit calculates the correction amount for correcting the torque instruction of the driving device configured to drive the vehicle from the estimated equivalent inertia information of the driving system and then corrects the torque instruction of the driving device using the calculated correction amount such that the control of the torque applied to the drive wheel is performed according to the corrected Marque instruction.

Subsequently, while the driving force decrease control is performed in the step S20, the driving force control unit 21 determines whether the current vehicle state reaches the slip suppress alleviating condition based on the current equivalent inertia change amount of the driving system.

In this process, the driving force control unit 21 compares the current equivalent inertia change amount with the second change amount threshold ($\delta 3$), which is the slip suppress alleviating determination reference, and determines that the current vehicle state satisfies the slip suppress alleviating condition when the equivalent inertia change amount is decreased to a value less than the second change amount threshold ($\delta 3$) to start the driving force decrease amount alleviating control (S21).

According to the exemplary embodiment of the present disclosure, the driving force control unit decreases the torque instruction correction amount in the step S21 to be smaller than the torque instruction correction amount in the step S20 in order to perform the driving force decrease amount alleviating control in the step S21, corrects the torque instruction according to the decreased torque instruction correction amount and then controls the driving of the driving device 1 by the corrected torque instruction.

At this time, the result of the control of alleviating the driving force decrease amount in the step S21 has no difference with the result of increasing the driving force by a predetermined amount compared to the decreased driving force in the step S20, and the decrease in the torque instruction correction amount in the step S21 means increasing the corrected torque instruction by an alleviating amount again in the step S20.

As described above, if it is determined that the current vehicle state satisfies the slip suppress alleviating condition during the driving force decrease control, the driving force decrease amount (torque instruction correction amount) is decreased by a predetermined amount, and then the processes of the steps S11 to S21 may be repeated again.

According to the exemplary embodiment of the present disclosure, when repeating the processes of the steps S11 to S21 again, the driving force control unit 21 of the control unit 20 decreases the driving force decrease amount by a set alleviating amount every control cycle in the steps S11 to S21.

Meanwhile, FIG. 7 is a diagram illustrating the wheel slip post counteraction mode, and as illustrated in FIG. 7, the wheel slip post counteraction mode does not have the process of determining the vehicle lateral load movement having the reference value or more by a comparison with the wheel slip basic counteraction mode (S12), and the process of performing the feed forward uneven braking control (S13) and however, one of the feedback uneven braking control and the driving force decrease control is performed or two controls are simultaneously performed only in the state where the wheel slip is detected by the equivalent inertia change amount.

If the vehicle lateral load movement having the reference value or more occurs in the wheel slip post counteraction mode compared to the wheel slip basic counteraction mode, all of the remaining processes excluding the process of performing the feed forward uneven braking control are the same as those of the wheel slip basic counteraction mode, and thus there is no difference between the description of all processes of the wheel slip post counteraction mode and the aforementioned description of the wheel slip basic counteraction mode, such that the repetitive description will be omitted.

As described above, while the exemplary embodiment of the present disclosure has been described in detail, the scope of the present disclosure is not limited thereto, and various changed and improved forms by those skilled in the art using the basic concept of the present disclosure defined by the appended claims are also included in the scope of the present disclosure.

What is claimed is:

1. A wheel slip control method of a vehicle, the method comprising:
  estimating, by a control unit, equivalent inertia information of a driving system based on operation information of the driving system while a vehicle travels;
  determining, by the control unit, whether a slip of a drive wheel occurs from the estimated equivalent inertia information of the driving system;
  responsive to a determination that the slip of the drive wheel occurs, determining, by the control unit, whether the drive wheel is in an uneven wheel slip state where the slip occurs in only one of a left wheel and a right wheel of the drive wheel from a left wheel speed and a right wheel speed detected by a sensor;
  responsive to a determination that the vehicle wheel is in the uneven wheel slip state, controlling, by the control unit, an operation of a braking device such that a braking force is applied to the vehicle wheel in which the slip occurs, wherein the equivalent inertia information of the driving system comprises an equivalent inertia value of the driving system calculated by a value obtained by dividing the torque instruction of a previous control cycle for a driving device configured to drive the vehicle by an angular acceleration of the driving system obtained by the rotating speed of the driving system, wherein a value of the equivalent inertia information is an equivalent inertia change amount which is a difference between the equivalent inertia of the driving system obtained in real time and basic equivalent inertia having a predetermined value;

calculating, by the control unit, a lateral load movement amount of the vehicle from current vehicle traveling information collected by the vehicle;

comparing, by the control unit, the calculated lateral load movement amount of the vehicle with a first movement amount threshold;

determining, by the control unit, an uneven load of a predetermined level or more occurs in the vehicle while the vehicle turns when the calculated lateral load movement amount of the vehicle is larger than the first movement amount threshold; and controlling, by the control unit, an operation of the braking device such that the braking force is applied to a vehicle wheel corresponding to an inner wheel upon turning, wherein, if the calculated lateral load movement amount of the vehicle is equal to or less than the first movement amount threshold, the control unit is configured to perform:

estimating equivalent inertia information of the driving system based on operation information of the driving system while the vehicle travels;

determining whether the slip of the drive wheel occurs from the estimated equivalent inertia information of the driving system;

responsive to a determination that the slip of the drive wheel occurs, determining whether the drive wheel is in an uneven wheel slip state where the slip occurs in only one of the left wheel and the right wheel of the drive wheel from the left wheel speed and the right wheel speed detected by the sensor; and responsive to a determination that the vehicle wheel is in the uneven wheel slip state, controlling the operation of a braking device such that a braking force is applied to the vehicle wheel in which the slip occurs.

2. The wheel slip control method of the vehicle of claim 1, wherein the vehicle is a vehicle mounted with an open differential distributing a driving force of the driving device configured to drive the vehicle to the left wheel and the right wheel at a ratio of 50:50.

3. The wheel slip control method of the vehicle of claim 1, wherein the control unit is configured to:
compare the equivalent inertia change amount with a predetermined first change amount threshold, and
determine that the slip of the drive wheel occurs if the equivalent inertia change amount is larger than the first change amount threshold.

4. The wheel slip control method of the vehicle of claim 1, wherein the operation information of the driving system comprises a torque instruction of the previous control cycle for the driving device configured to drive the vehicle and a rotating speed of the driving system detected by a speed detecting unit.

5. The wheel slip control method of the vehicle of claim 1, wherein in the controlling of the operation of the braking device such that the braking force is applied to the vehicle wheel corresponding to the inner wheel upon turning, the braking force is determined as a value corresponding to the calculated lateral load movement amount of the vehicle by the control unit.

6. The wheel slip control method of the vehicle of claim 1, wherein in the controlling of the operation of the braking device, the braking force is determined as a value corresponding to the equivalent inertia change amount by the control unit.

7. The wheel slip control method of the vehicle of claim 1, wherein in the controlling of the operation of the braking device, the braking force is determined, by the control unit, as a value corresponding to a speed difference between the vehicle wheel in which the slip occurs and the vehicle wheel in which the slip does not occur of the drive wheel such that a speed of the vehicle wheel in which the slip occurs becomes a control input value tracking a speed of the vehicle wheel in which the slip does not occur by setting the speed of the vehicle wheel in which the slip does not occur of the drive wheel as a target speed.

8. The wheel slip control method of the vehicle of claim 7, wherein the speed of the vehicle wheel in which the slip does not occur to which the kinematic characteristic of the vehicle is reflected is used as the speed of the vehicle wheel in which the slip does not occur of the drive wheel.

9. The wheel slip control method of the vehicle of claim 1, further comprising:

determining, by the control unit, whether a current vehicle state reaches a slip suppress alleviating condition based on the lateral load movement amount of the vehicle obtained by the estimated equivalent inertia information of the driving system and current vehicle traveling information, while the braking force is applied to the vehicle wheel in which the slip occurs by controlling the operation of the braking device; and controlling the operation of the braking device such that the braking force applied to the vehicle wheel in which the slip occurs is decreased by a predetermined amount, if the current vehicle state reaches the slip suppress alleviating condition.

10. The wheel slip control method of the vehicle of claim 9, wherein in the determining of whether the current vehicle state reaches the slip suppress alleviating condition, a value of the equivalent inertia information is an equivalent inertia change amount, which is a difference between the equivalent inertia of the driving system obtained in real time and basic equivalent inertia having a predetermined value, and wherein the control unit determines that the current vehicle state reaches the slip suppress alleviating condition if the equivalent inertia change amount is less than a predetermined second change amount threshold and the lateral load movement amount of the vehicle is less than a predetermined second movement amount threshold.

11. The wheel slip control method of the vehicle of claim 1, further comprising:

collecting, by the control unit, the left wheel speed and the right wheel speed by the sensor;

determining, by the control unit, whether the slip occurs both in the left wheel and the right wheel of the drive wheel; and in response to determining that the slip occurs both in the left wheel and the right wheel, performing, by the control unit, a driving force decrease control of decreasing the driving force of the driving device transferred to the drive wheel.

12. The wheel slip control method of the vehicle of claim 11,
wherein in the performing of the driving force decrease control, the decrease amount of the driving force is determined as a value corresponding to the equivalent inertia information, and
wherein the equivalent inertia information is an equivalent inertia change amount which is a difference between the equivalent inertia of the driving system obtained in real time and basic equivalent inertia having a predetermined value.

13. The wheel slip control method of the vehicle of claim 11, further comprising:
determining, by the control unit, whether the current vehicle state reaches a slip suppress alleviating condition based on the estimated equivalent inertia information of the driving system, while performing the driving force decrease control, the control unit; and
performing, by the control unit, a driving force decrease amount alleviating control of applying a driving force decrease amount reduced by a predetermined amount, if the current vehicle state reaches the slip suppress alleviating condition upon the driving force decrease control.

14. The wheel slip control method of the vehicle of claim 13,
wherein in the determining of whether the current vehicle state reaches the slip suppress alleviating condition, a value of the equivalent inertia information is the equivalent inertia change amount which is the difference between the equivalent inertia of the driving system obtained in real time and the basic equivalent inertia having the predetermined value, and
wherein the control unit determines that the current vehicle state reaches the slip suppress alleviating condition if the equivalent inertia change amount is less than a predetermined second change amount threshold.

15. The wheel slip control method of the vehicle of claim 11,
wherein the control unit compares the difference between the left wheel speed and the right wheel speed with a predetermined threshold speed difference to determine that the drive wheel is in an uneven wheel slip state where the slip occurs only in one of the left wheel and the right wheel, if the difference between the left wheel speed and the right wheel speed is larger than the threshold speed difference, and
to determine that the drive wheel is in the state where the slip occurs both in the left wheel and the right wheel if the difference between the left wheel speed and the right wheel speed is equal to or less than the threshold speed difference.

16. A wheel slip control method of a vehicle, the method comprising:
estimating, by a control unit, equivalent inertia information of a driving system based on operation information of the driving system while a vehicle travels;
determining, by the control unit, whether a slip of a drive wheel occurs from the estimated equivalent inertia information of the driving system;
responsive to a determination that the slip of the drive wheel occurs, determining, by the control unit, whether the drive wheel is in an uneven wheel slip state where the slip occurs in only one of a left wheel and a right wheel of the drive wheel from a left wheel speed and a right wheel speed detected by a sensor;
responsive to a determination that the vehicle wheel is in the uneven wheel slip state, controlling, by the control unit, an operation of a braking device such that a braking force is applied to the vehicle wheel in which the slip occurs, wherein the equivalent inertia information of the driving system comprises an equivalent inertia value of the driving system calculated by a value obtained by dividing the torque instruction of a previous control cycle for a driving device configured to drive the vehicle by an angular acceleration of the driving system obtained by the rotating speed of the driving system, wherein a value of the equivalent inertia information is an equivalent inertia change amount which is a difference between the equivalent inertia of the driving system obtained in real time and basic equivalent inertia having a predetermined value;
calculating, by the control unit, a lateral load movement amount of the vehicle from current vehicle traveling information collected by the vehicle;
comparing, by the control unit, the calculated lateral load movement amount of the vehicle with a first movement amount threshold;
determining, by the control unit, an uneven load of a predetermined level or more occurs in the vehicle while the vehicle turns when the calculated lateral load movement amount of the vehicle is larger than the first movement amount threshold; and
controlling, by the control unit, an operation of the braking device such that the braking force is applied to a vehicle wheel corresponding to an inner wheel upon turning,
wherein, if the calculated lateral load movement amount of the vehicle is larger than the first movement amount threshold, the control unit controls the operation of the braking device such that the braking force is applied to the vehicle wheel corresponding to the inner wheel upon turning, and then is configured to perform:
estimating equivalent inertia information of the driving system based on operation information of the driving system while the vehicle travels;
determining whether the slip of the drive wheel occurs from the estimated equivalent inertia information of the driving system;
responsive to a determination that the slip of the drive wheel occurs, determining whether the drive wheel is in an uneven wheel slip state where the slip occurs in only one of the left wheel and the right wheel of the drive wheel from the left wheel speed and the right wheel speed detected by the sensor; and
responsive to a determination that the vehicle wheel is in the uneven wheel slip state, controlling the operation of a braking device such that a braking force is applied to the vehicle wheel in which the slip occurs.

* * * * *